(12) United States Patent
Ko

(10) Patent No.: US 9,179,501 B2
(45) Date of Patent: Nov. 3, 2015

(54) MULTI-CARRIER INTEGRATION APPARATUS FOR DISTRIBUTED ANTENNA SYSTEM

(71) Applicant: Advanced RF Technologies, Inc., Burbank, CA (US)

(72) Inventor: Young-Hoon Ko, Icheon (KR)

(73) Assignee: ADVANCED RF TECHNOLOGIES, INC., Burbank, CA (US)

( * ) Notice: Subject to any disclaimer, the term of this patent is extended or adjusted under 35 U.S.C. 154(b) by 83 days.

(21) Appl. No.: 13/836,126

(22) Filed: Mar. 15, 2013

(65) Prior Publication Data

US 2014/0233435 A1 Aug. 21, 2014

Related U.S. Application Data

(60) Provisional application No. 61/767,179, filed on Feb. 20, 2013.

(51) Int. Cl.
H04W 88/08 (2009.01)
(52) U.S. Cl.
CPC .................................. *H04W 88/085* (2013.01)
(58) Field of Classification Search
CPC .............................. H04W 88/08; H04W 88/00
See application file for complete search history.

(56) References Cited

U.S. PATENT DOCUMENTS

| 8,780,854 B2 * | 7/2014 | Bi et al. | 370/330 |
|---|---|---|---|
| 2002/0075906 A1 * | 6/2002 | Cole et al. | 370/535 |
| 2010/0128676 A1 * | 5/2010 | Wu et al. | 370/328 |
| 2012/0177026 A1 * | 7/2012 | Uyehara et al. | 370/345 |
| 2012/0249263 A1 * | 10/2012 | Zhang | 333/132 |
| 2013/0326495 A1 * | 12/2013 | Reunamaki et al. | 717/173 |

FOREIGN PATENT DOCUMENTS

WO WO 2012024345 A2 * 2/2012

* cited by examiner

*Primary Examiner* — Edan Orgad
*Assistant Examiner* — Emmanuel Maglo
(74) *Attorney, Agent, or Firm* — Christie, Parker & Hale, LLP

(57) ABSTRACT

A band combiner unit includes a plurality of carrier modules (CMs) each configured to be connected to a base transceiver station (BTS) or bi-directional amplifier (BDA) for corresponding ones of the carriers, wherein each of the CMs is configured to transmit downlink signals from the corresponding BTS/BDA, adjust the downlink signals, and transmit the downlink signals to a first combiner, and to receive uplink signals from a second combiner, adjust the uplink signals, and transmit the uplink signals to the corresponding BTS/BDA, the first combiner configured to combine the downlink signals from the CMs, and transmit the combined downlink signals to a distributed antenna system (DAS), the second combiner configured to split a combined uplink signal from a DAS, and transmit the split uplink signals to corresponding ones of the CMs, and a band combiner unit controller for monitoring and controlling the CMs.

18 Claims, 4 Drawing Sheets

MULTI-CARRIER INTEGRATION APPARATUS FOR DISTRIBUTED ANTENNA SYSTEM

CROSS-REFERENCE TO RELATED APPLICATION(S)

The present application claims priority to and the benefit of U.S. Provisional Patent Application Ser. No. 61/767,179, filed Feb. 20, 2013, the contents of which are hereby incorporated by reference in their entirety.

BACKGROUND

1. Field of the Invention

Embodiments of the present invention is related to an apparatus for a distributed antenna system (DAS), and more specifically, to a multi-carrier integration unit or band combiner unit (BCU) for a DAS, to facilitate more efficient multi-carrier service.

2. Description of Related Art

Distributed antenna systems (DAS) are utilized to provide more stable wireless mobile telecommunications services inside buildings, such as large stadiums, hospitals, hotels, campuses, etc. With an increasing number of mobile communication subscribers, the number of bands and carriers (e.g., wireless service providers) are also increasing. In view of this, support of multiple bands, as well as of multiple carriers, by a DAS may be becoming more desirable. Meanwhile, limiting use of a DAS to a single carrier may be less desirable in, for example, the aspects of resource efficiency and cost efficiency.

In general, a DAS is an apparatus for amplifying and transmitting signals so that base transceiver station (BTS) signals can reach RF shadow areas in large buildings and structures, and can also simultaneously be utilized for amplifying the signals transmitted by mobile stations (MS) or user equipment existing or located in the RE shadow areas, and for transmitting these signals to BTS in the opposite direction from the relay direction described above.

In a conventional DAS, RF units (RFU) located in head end (HE) units are assigned corresponding to each carrier and are respectively connected with a BTS or a bi-directional amplifier (BDA) corresponding to the carrier. The RFUs adjust signals received from the BTS or BDA to an appropriate level to transmit them to remote units (RU) via optic lines after electrical-to-optical (E/O) conversion and optic distribution.

A conventional DAS requires a plurality of RFUs in order to support multi-carrier service, because each RFU typically can only support one carrier. Accordingly, as the number of carriers increases, the number of RFUs used will generally increase. This may cause problems of increasing initial investment costs of the system, as well as operation costs, such as electrical bills, maintenance costs, and the like.

SUMMARY

Embodiments of the present invention are directed to an apparatus to connect BTS or BDA with a DAS by integrating or distributing multiple carrier signals. To be more specific, to accommodate one or more additional carriers after installation of a DAS for a specific single carrier (e.g., for a mobile telecommunication business), operating costs as well as installation costs, may be saved by using one RF unit, rather than installing more RE units based on the number of carriers. Such a system may be further accompanied by enhancement of efficiency.

The problems mentioned above can be solved through the combination of a single RFU and a band combiner unit (BCU), rather than having multiple RFUs respectively connected to each carrier without a BCU.

Embodiments of the present invention have been proposed to solve some of the above problems of the conventional DAS, and includes providing a BCU for a DAS to facilitate the servicing of multiple carriers, while also facilitating gain control and monitoring functions for each of the different carriers.

One exemplary embodiment includes a band combiner unit (BCU) including a plurality of carrier modules (CMs) each configured to be connected to a base transceiver station (BTS) or a bi-directional amplifier (BDA) for a corresponding one of the carriers, wherein each of the CMs is configured to transmit downlink signals from the corresponding BTS or BDA, to adjust the downlink signals, and to transmit the downlink signals to a first combiner, and to receive uplink signals from a second combiner, to adjust the uplink signals, and to transmit the uplink signals to the corresponding BTS or BDA, the first combiner configured to combine the downlink signals transmitted from each of the CMs, and to transmit the combined downlink signals to a distributed antenna system (DAS), the second combiner configured to split a combined uplink signal transmitted from a DAS, and to transmit the split uplink signals to corresponding ones of the plurality of CMs according to the respective carrier, and a hand combiner unit controller (BCUC) for monitoring and controlling the plurality of CMs.

Each of the CMs may include a duplexer configured to be connected with the corresponding BTS or BDA and to divide a downlink signal path from an uplink signal path, a fixed attenuator configured to attenuate the downlink signals transmitted from the corresponding BTS or BDA, a detector configured to detect levels of the downlink signals transmitted from the corresponding BTS or BDA and to transmit the detected information to the BCUC, a first variable attenuator on the downlink signal path configured to adjust the downlink signals, a second variable attenuator on the uplink signal path configured to adjust the uplink signals, and an amplifier on the uplink signal path configured to amplify the uplink signals.

The BCUC may be configured for direct access through a user-controlled screen associated with the BCU, and/or may be configured for access through a connected DAS, such that a user can control the BCU via the connected DAS, and/or may be configured such that communication with a connected DAS is controllable remotely, such that the BCUC is controllable by a user separated from at least one of the BCU or the connected DAS.

The BCU may be configured to support multiple input multiple output (MIMO) systems.

According to embodiments of the present invention, the following effects, among others, may be realized.

First, installation costs and operating costs may be reduced, accompanied by enhancement of operating and management efficiencies, since multiple carriers can be connected to a single RFU using the BCU, rather than connecting with multiple RFU's based on carrier.

Secondly, by replacing the same functions of multiple RFUs with a single BCU, the BCU can be utilized, for example, to support gain control for each carrier, and for multiple signals per carrier, inputted in the DAS, and may also be utilized to maintain set power ratios for each carrier while in operation.

DETAILED DESCRIPTION

With reference to the attached drawings, exemplary embodiments for implementing the present invention will be described in detail below. Similar features may be represented by the same or similar reference numbers.

Figure 1:
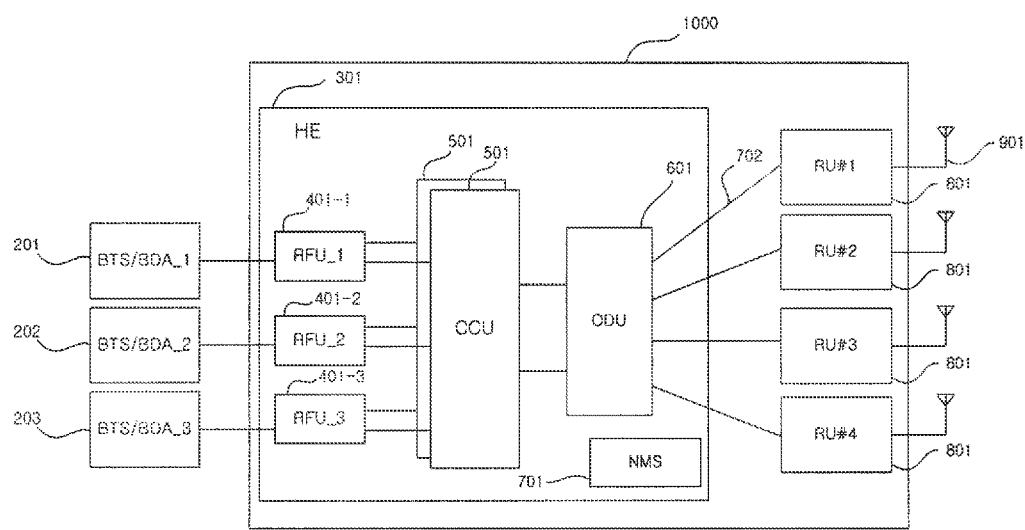
FIG. 1 is a general configuration of a DAS, showing a schematic diagram where there are a same number of RFU's as there are a number of carriers for a single frequency band (e.g., three carriers as shown in the figure)

FIG. 1 shows a general configuration of a distributed antenna system (DAS) with a separate RF Unit (RFU) for each carrier, respectively, where the system supports three carriers.

In FIG. 1, the DAS (1000) includes a head end (HE) 301 and remote units (RU) 801, where a separate RFU (401-1, 401-2, 401-3) is assigned for each carrier, and RF interfaces with Base Transceiver Stations/Bi-directional Amplifiers (BTS/BDA) 201, 202, 203 for each respective carrier. The HE (301) is connected with the RUs (801) through optic lines, where the system expands into multiple RU's 801 through optic expansion. Each RU (801) is connected to the HE (301) via an optic core line (702), and transmits signals to, and/or receives signals from, for example, a Mobile Station (not shown in FIG. 1) through server antennas (901).

Figure 2:
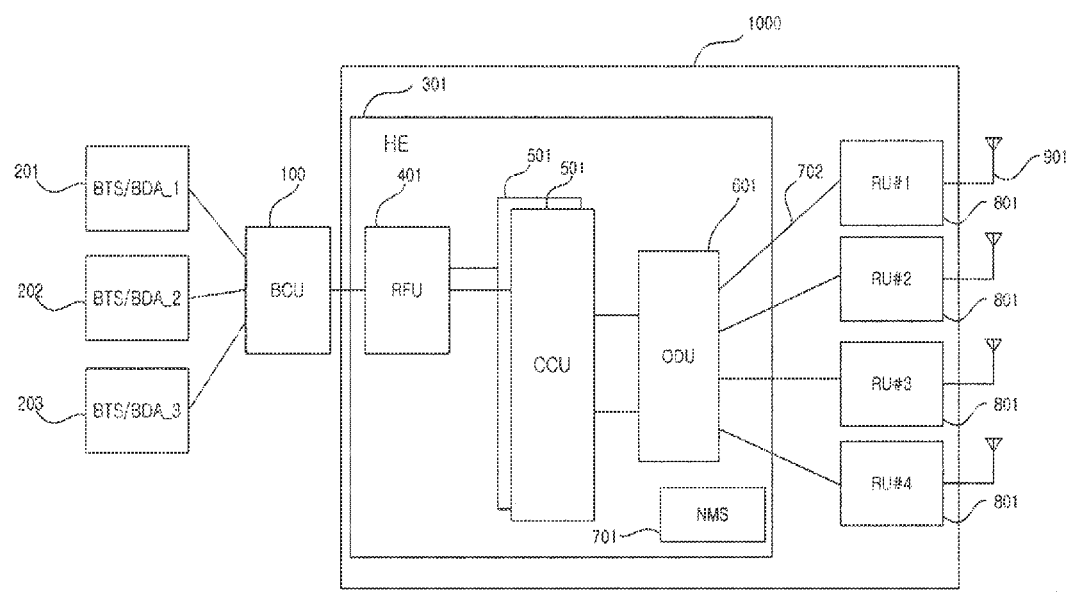
FIG. 2 is a configuration of a DAS connected with a BCU according to an embodiment of the present invention, showing a schematic diagram for supporting three carriers at a single band.

FIG. 2 is a configuration of a DAS (1000) connected with a band combiner unit (BCU) 100 according to an embodiment of the present invention, showing a configuration supporting three carriers.

In FIG. 2, the BCU (100) is located between the BTSs/BDAs (201, 202, 203) for multiple carriers and the DAS (1000), enabling servicing of the multiple carriers for the DAS (1000).

Figure 3:
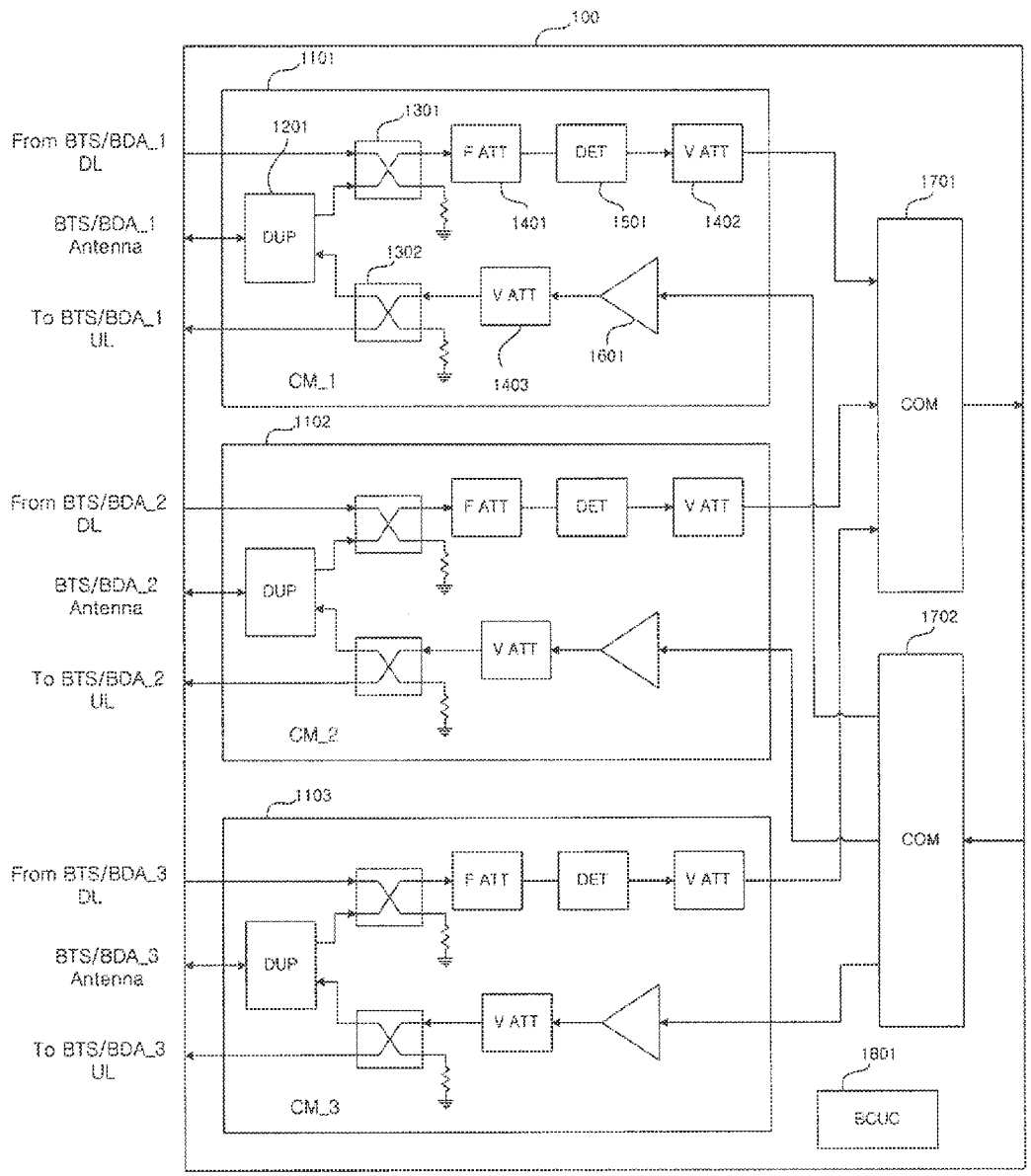
FIG. 3 is a schematic diagram of a BCU supporting three carriers in accordance with an embodiment of the present invention.

FIG. 3 a configuration of the BCU (100) of FIG. 2, supporting three carriers, according to an embodiment of the present invention.

As shown in FIG. 3, the BCU (100) includes multiple Carrier Modules (CMs) 1101, 1102, 1103, multiple Combiners (COMs) 1701, 1702, each having a number of ports corresponding to the number of carriers connected, and a BCU controller (1801).

The CMs (1101, 1102, 1103) each includes a duplexer (DUP) 1201 for dividing paths of downlink and uplink signals for respective connections with service antenna ports of each of the multiple BTSs/BDAs (201, 202, 203) for the different carriers using the same band, a Hybrid Coupler (1301, 1302) for downlink and uplink signals, respectively, which can be enabled, for example, when downlink and uplink ports for the BDA or BTS (201, 202, 203) connected to the DAS are separate, a Fixed Attenuator (F ATT) 1401 for preventing or reducing BCU damage by attenuating downlink high-output power signals inputted from the BTSs/BDAs (201, 202, 203) down to an appropriate level, a Detector (DET) 1501 for detecting a level of the downlink signals inputted from the BTSs/BDAs (201, 202, 203) and for communicating the detected level information to the BCUC 1801, Variable Attenuators (V ATT) 1402, 1403 that exist on the downlink path and the uplink path, respectively, for adjusting RF signals to an appropriate level, and an Amplification part (1601) on the uplink path for amplifying a level of the uplink signals inputted into the CMs 1101, 1102, 1103 for each carrier. As shown in FIG. 3, the COMs 1701, 1702 that are connected with the CMs 1101, 1102, 1103 are included for both the downlink path and the uplink path, for combining multiple signals into a single path in the downlink direction, and for dividing and distributing signals according to the respective carriers in the uplink direction. The BCUC (1801) monitors the levels of the downlink signals inputted from the multiple BTSs/BDAs (201, 202, 203) and controls the various gains.

A user is capable of direct access to the BCUC (1801) through, for example, a Graphic User Interface (GUI) via, for example, downloading of firmware.

Also, the BCUC (1801) is capable of communicating with the DAS (1000), and of confirming and controlling the status of the BCU (100) through, for example, a connected GUI.

In addition, the BCUC (1801) may be able to confirm and control not only the status of the BCUC (1801), but also the status of the DAS (1000), through such a GUI.

Also, with a Commissioning function, the BCUC (1801) can automatically set the gains for each carrier, based on a desired commissioning level and power ratio for each carrier, which can be set by the user. After commissioning is completed, the BCUC (1801) can automatically control the gain for each carrier not to exceed a maximum output power for each carrier, which can be monitored and calculated while the BCU (100) is commissioning. That is, the BCUC (1801) can automatically control the gain for each carrier, so that a maximum output level for each carrier, set based on, for example, power ratio, is not exceeded, even when one carrier's signals may be greater than the set commissioning level in the commissioning stage. This allows the power ratio per carrier outputted in the RUs to be maintained more constantly, and as a result, the service coverage at each of the RUs per carrier can be more stable and fluctuate less.

Also, the BCUC (1801) may have an Auto Level Control or Auto Gain Control function, which makes better protection of the BTSs/BDAs (201, 202, 203) and the DAS (1000) possible, as well as improve protection of the service quality generally against excessive output levels.

For communicating with the BCUC (1801) and DAS (1000), diverse methods, including series communication methods such as RS485 and Ethernet communications, among others, may be utilized.

Furthermore, even in remote areas where a user cannot be directly connected with the DAS (1000) site through a GUI, the BCUC (1801) may allow connections with the DAS (1000) through, for example, a separate Ethernet or Web GUI for confirmation and control of the status of the BCU (100), as well as for downloading of firmware.

With the BCUC (1801), the user can store each setting parameter as a file for all units installed in the DAS (1000), and can confirm the contents of stored files.

Meanwhile, although FIG. 3 shows a diagram for 3 carriers, application to other numbers of carriers is also possible using, for example, Multi-way COMs 1701, 1702, configured to be connected to a different number of CMs and to facilitate a different number of pathways.

Figure 4:
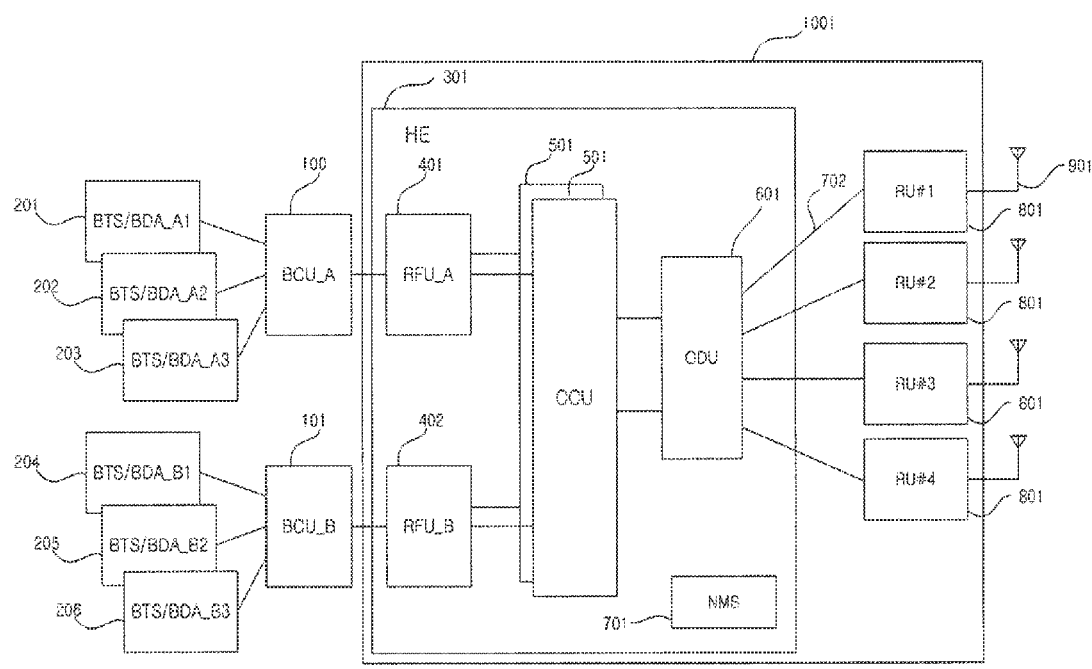
FIG. 4 is a schematic diagram of a DAS supporting two bands and three carriers per band, according to an embodiment of the present invention.

FIG. 4 shows a configuration of a DAS supporting two Bands and three carriers per Band, according to an embodiment of the present invention. Other individual features or parts similar to those of FIG. 3 are labeled with the same reference numerals.

For the BCUs (100, 101) in the embodiment of FIG. 4, MIMO (Multiple Input Multiple Output) can be supported by using, for example, two or more BCUs with the same or similar configurations as the BCU (100) connected to the BTSs/BDAs (201, 202, 203) shown in FIG. 2. Here, a separate BCU may be dedicated for each band being utilized, and each BCU may be connected to a corresponding RFU. Other parts of the DAS may be configured similarly as seen in previous embodiments.

The BCU in accordance with embodiments of the present invention can support various globally used specifications and protocols of wireless mobile telecommunications. As an example, frequencies from VHF to up to a few GHz may be supported. For protocols, AMPS, TDMA, GSM, CDMA, IDEN, WIMAX, LTE, WCDMA, Public safety, GPRS, EDGE, and Paging, among others, may be supported. For Mobile technology generations, 1G, 2G, 3G, 4G, and any subsequent generations can also be serviced.

The above descriptions of embodiments of the present invention are only intended for illustration, and those with knowledge in the technology area to which the present invention belongs will understand that various transformations or modifications are possible, without changing the technological idea or essential characteristics of the invention. Therefore, the embodiments described above should be understood as being illustrative in all aspects, and should not be limiting. For instance, each constituent element described as a single form may be dispersed for implementation, and likewise the constituent elements described as being dispersed may instead be implemented in a combined form.

The scope of the present invention is defined by the following claims, and it is to be appreciated that all modifications and variations derived from the meanings and scope of the claims and equivalents thereof are intended to fall within the scope of the present invention.

What is claimed is:

1. A band combiner unit (BCU) to be utilized for a plurality of carriers, comprising:
    a plurality of carrier modules (CMs) each configured to be connected to a single corresponding base transceiver station (BTS) or bi-directional amplifier (BDA) for a corresponding one of the carriers, wherein the CMs of the BCU are each configured to be connected to a different corresponding BTS or BDA than each of the other CMs of the BCU, and wherein each of the CMs is configured to transmit downlink signals from the corresponding BTS or BDA, to adjust the downlink signals, and to transmit the downlink signals to a first combiner, and to receive uplink signals from a second combiner, to adjust the uplink signals, and to transmit the uplink signals to the corresponding BTS or BDA;
    the first combiner configured to combine the downlink signals transmitted from each of the CMs, and to transmit the combined downlink signals to a distributed antenna system (DAS);
    the second combiner configured to split a combined uplink signal transmitted from a DAS, and to transmit the split uplink signals to corresponding ones of the plurality of CMs according to the respective carrier; and
    a band combiner unit controller (BCUC) for monitoring and controlling the plurality of CMs.

2. The BCU according to claim 1, wherein each of the CMs comprises:
    a duplexer configured to be connected with the corresponding BTS or BDA and to divide a downlink signal path from an uplink signal path;
    a fixed attenuator configured to attenuate the downlink signals transmitted from the corresponding BTS or BDA;
    a detector configured to detect levels of the downlink signals transmitted from the corresponding BTS or BDA and to transmit the detected information to the BCUC;
    a first variable attenuator on the downlink signal path configured to adjust the downlink signals;
    a second variable attenuator on the uplink signal path configured to adjust the uplink signals; and
    an amplifier on the uplink signal path configured to amplify the uplink signals.

3. The BCU according to claim 2, wherein each CM further comprises:
    a first hybrid coupler on the downlink signal path configured to be connected with an output of the corresponding BTS or BDA; and
    a second hybrid coupler on the uplink signal path configured to be connected with an input of the corresponding BTS or BDA.

4. The BCU according to claim 2, wherein along the downlink signal path, the fixed attenuator is connected to an output of the duplexer, the detector is connected to an output of the fixed attenuator, and the first variable attenuator is connected to an output of the detector, and wherein along the uplink signal path, the second variable attenuator is connected to an output of the amplifier, and the duplexer is connected to an output of the second variable attenuator.

5. The BCU according to claim 1, wherein each of the first and second combiners is configured to support a number of carriers equal to or greater than the number of carriers to which the BCU is connected.

6. The BCU according to claim 1, wherein the BCUC is configured for direct access through a user-controlled screen associated with the BCU.

7. The BCU according to claim 6, wherein the BCUC is further configured such that a user can control a connected DAS through the user-controlled screen associated with the BCU.

8. The BCU according to claim 7, wherein the BCUC is further configured such that a user can store and confirm setting information for each component or feature in the BCU or in a connected DAS through the user-controlled screen associated with the BCU.

9. The BCU according to claim 1, wherein BCUC is configured for access through a connected DAS, such that a user can control the BCU via the connected DAS.

10. The BCU according to claim 1, wherein the BCUC is configured such that a commissioning function allows for adjusting of levels of the downlink signals transmitted to each CM from the corresponding BTS or BDA based on power ratio.

11. The BCU according to claim 10, wherein the levels of the downlink signals are individually adjustable for each respective carrier.

12. The BCU according to claim 1, wherein the BCUC is configured to perform at least one of an auto level control function or an auto gain control function to protect the respective BTSs and/or BDAs and the DAS against excessive output levels.

13. The BCU according to claim 12, wherein the at least one of the auto level control function or the auto gain control function are further utilized to enhance service quality.

14. The BCU according to claim 1, wherein communication between the BCUC and a connected DAS is facilitated via RS485 or other serial communication method.

15. The BCU according to claim 1, wherein communication between the BCUC and a connected DAS is facilitated via Ethernet.

16. The BCU according to claim 1, wherein the BCU is configured such that communication with a connected DAS is controllable remotely, such that the BCUC is controllable by a user separated from at least one of the BCU or the connected DAS.

17. The BCU according to claim 16, wherein the BCU is further configured such that corresponding firmware is downloadable by a user separated from at least one of the BCU or the connected DAS.

18. The BCU according to claim 1, wherein the BCU is configured to support multiple input multiple output (MIMO) systems.

* * * * *